(12) United States Patent
Maeda

(10) Patent No.: US 11,154,798 B2
(45) Date of Patent: Oct. 26, 2021

(54) MAGNETIC FILTRATION APPARATUS

(71) Applicant: Maeda Shell Service Co., Ltd., Okazaki (JP)

(72) Inventor: Tatsuhiro Maeda, Okazaki (JP)

(73) Assignee: Maeda Shell Service Co., Ltd., Okazaki (JP)

(*) Notice: Subject to any disclaimer, the term of this patent is extended or adjusted under 35 U.S.C. 154(b) by 0 days.

(21) Appl. No.: 16/751,825

(22) Filed: Jan. 24, 2020

(65) Prior Publication Data

US 2020/0155983 A1    May 21, 2020

Related U.S. Application Data

(63) Continuation of application No. PCT/JP2019/014927, filed on Apr. 4, 2019.

(30) Foreign Application Priority Data

Aug. 29, 2018  (JP) ............................. JP2018-160738

(51) Int. Cl.
*B01D 35/06* (2006.01)
*B01D 12/00* (2006.01)
(Continued)

(52) U.S. Cl.
CPC ............. *B01D 35/06* (2013.01); *B01D 12/00* (2013.01); *B01D 29/009* (2013.01); *B03C 1/32* (2013.01)

(58) Field of Classification Search
CPC ...... B01D 35/06; B01D 12/00; B01D 29/009; B01D 21/00; B01D 24/04; B01D 36/04;
(Continued)

(56) References Cited

U.S. PATENT DOCUMENTS 2,798,611 A * 7/1957 Prevost ..................... B03C 1/28
                                                          210/222
5,240,593 A * 8/1993 Moredock .......... B01D 21/0012
                                                          210/87
(Continued)

FOREIGN PATENT DOCUMENTS

DE    198 33 293 C1    1/2000
GB       2504365 A     1/2014
(Continued)

*Primary Examiner* — Nam X Nguyen
*Assistant Examiner* — Ekandra S. Miller-Cruz
(74) *Attorney, Agent, or Firm* — Burr & Brown, PLLC

(57) ABSTRACT

Provided is a magnetic filtration apparatus with a simple structure for permitting easy and effective discharge of magnetic substances from the inside of a flow passage to its outside, the magnetic substances being captured by attraction from a liquid to be treated by magnetic separation. The magnetic filtration apparatus includes a treatment container 12 having an inlet 26 and outlet 28 of the liquid, and a discharge port 36 of the separated magnetic substances. A magnetic apparatus 20 attached around the treatment container 12 attracts the separated magnetic substances to an inner wall of the treatment container 12, while cancellation of the effect of the magnetic field generated by the magnetic apparatus 20 allows the attracted magnetic apparatus to flow into a detachable collecting container 14 positioned below the treatment container 12, due to the gravity, through a communication passage 15.

12 Claims, 10 Drawing Sheets

(51) Int. Cl.
  *B01D 29/00* (2006.01)
  *B03C 1/32* (2006.01)

(58) Field of Classification Search
  CPC ........ B01D 39/00; B01D 21/34; B01D 24/16;
    B01D 35/185; B01D 21/0012; B01D
    21/245; B01D 21/2411; B01D 21/0024;
    B01D 21/009; B01D 21/26; B01D 21/02;
    B01D 21/0009; B01D 21/302; B01D
    21/283; B01D 29/15; B01D 29/94; B03C
    1/32; B03C 1/0332; B03C 1/288; B03C
    2201/18; B03C 2201/28
  USPC .......................................................... 210/223
  See application file for complete search history.

(56) References Cited

U.S. PATENT DOCUMENTS

| | | | | |
|---|---|---|---|---|
| 5,714,063 | A * | 2/1998 | Brunsting | B03C 1/0332 |
| | | | | 210/222 |
| 6,464,863 | B1 * | 10/2002 | Nguyen | B01D 35/027 |
| | | | | 210/167.03 |
| 7,390,405 | B2 * | 6/2008 | Liu | B03C 1/288 |
| | | | | 210/223 |
| 7,909,990 | B2 * | 3/2011 | Takahashi | B04C 5/185 |
| | | | | 210/86 |
| 8,894,851 | B1 * | 11/2014 | Jacobs | C10M 175/0058 |
| | | | | 210/167.03 |
| 2002/0158735 | A1 | 10/2002 | Rightmire | |
| 2004/0142384 | A1 | 7/2004 | Cohen et al. | |
| 2006/0037902 | A1 * | 2/2006 | Pedersen | C02F 1/482 |
| | | | | 210/222 |
| 2008/0067130 | A1 | 3/2008 | Hall | |
| 2013/0020096 | A1 * | 1/2013 | DeRouen, Sr. | E21B 33/068 |
| | | | | 166/382 |
| 2015/0165447 | A1 | 6/2015 | Sazawa | |
| 2019/0224688 | A1 | 7/2019 | Downie | |

FOREIGN PATENT DOCUMENTS

| | | |
|---|---|---|
| GB | 2551828 A | 1/2018 |
| JP | S59-095913 A1 | 6/1984 |
| JP | H05-002713 U | 1/1993 |
| JP | 2000-501643 A1 | 2/2000 |
| JP | 2001-104822 A1 | 4/2001 |
| JP | 2006-516890 A1 | 7/2006 |
| JP | 2007-105659 A1 | 4/2007 |
| JP | 2010-227825 A1 | 10/2010 |
| JP | 2011-011205 A1 | 1/2011 |
| WO | WO2014/098040 A1 | 1/2017 |

* cited by examiner

MAGNETIC FILTRATION APPARATUS

CROSS REFERENCE TO RELATED APPLICATION

This application is a continuation of the International Application No. PCT/JP2019/014927 filed on Apr. 4, 2019, which claims the benefit under 35 U.S.C. § 119(a)-(d) of Japanese Application No. 2018-160738 filed on Aug. 29, 2018, the entireties of which are incorporated herein by reference.

BACKGROUND OF THE INVENTION

Field of the Invention

The present invention relates to a magnetic filtration apparatus. In particular, the invention relates to an improved structure of a magnetic filtration apparatus for attracting and separating magnetic substances from a liquid which is contaminated with the magnetic substances such as ferromagnetic particulates, by utilizing magnetic force.

Description of Related Art

Known devices and equipment with a structure in which a liquid such as a lubricating oil and a hydraulic oil circulates within their inside, including an engine, a transmission and various hydraulic systems, have been employed for various uses. During use of those devices and equipment, surfaces of their metal parts are gradually worn out to generate metal particulates, and the metal particulates generated due to the abrasion of the metal parts inevitably contaminate the liquid circulating inside the devices and equipment, and become suspended in the liquid. The metal particulates in the liquid further promote the abrasion of the surfaces of the metal parts. Besides, also in the case of machine tools such as a honing machine and a grinder, a coolant such as a grinding fluid and a cutting fluid stored in a feeding tank is provided to a workpiece positioned on a processing part of the machine tool during grinding operation. Metal particles generated from the ground workpiece, such as fine metal powder, metal abrasive grains and waste metal (cuttings), contaminate the coolant to be recovered from the processing part. It is difficult to reuse the coolant contaminated with the metal particles.

In the case of the above-mentioned engine, transmission and hydraulic systems, the metal parts subjected to the abrasion are formed of ferromagnetic substances including iron, and in the case of the machine tools, workpieces formed of the ferromagnetic substances including the iron are subjected to grinding operation, for example. Thus, the used lubricating oil, hydraulic oil, coolant and the like are contaminated with particulates of the ferromagnetic substances. For this reason, those liquids are percolated by means of a filtration apparatus installed in the midway of a passage of the liquids, such that the fine particles contaminating the liquids are separated, recovered and removed. Filtration apparatuses with various structures have been suggested for this purpose.

As one of the filtration apparatuses, a magnetic filtration apparatus configured to attract and separate (percolate) ferromagnetic particulates (metal particulates) contaminating a liquid by utilizing magnetic energy is drawing attention. Among the filtration apparatuses, the magnetic filtration apparatus has an advantage, for example, that it is more resistant to clogging in comparison with a conventional filtration apparatus using a percolation-type filter element, so that regular cleaning and replacement of a filter element are not required, resulting in a reduced running cost.

For example, JP2000-501643A and JP2010-227825A disclose a magnetic filtration apparatus comprising a casing with introducing and emitting ports of a fluid to be treated which contains the ferromagnetic substances, and at least one magnetic filter unit accommodated in the casing. The magnetic filter unit comprises a magnet, and a pair of ferromagnetic plates, which are opposed to each other and partly contacted with the magnet positioned between the plates. A non-contact portion with the magnet in each of the pair of ferromagnetic plates forms one of the pole pieces which are magnetized to mutually different polarities, and each of the pole pieces of the ferromagnetic plates are arranged to oppose to each other at a predetermined distance. Furthermore, each of the mutually opposed portions of the pole pieces has a fluid passage, which is, for example, a cutout part or a penetrating hole, and permits passing of the fluid.

The fluid introduced into the casing from the introducing port is allowed to flow from one ferromagnetic plate side to the other ferromagnetic plate side, through the fluid passages arranged in each of the ferromagnetic plates. While the fluid flows, the ferromagnetic particulates in the fluid are attracted and attached to the pole pieces, so that the ferromagnetic particulates are separated from the fluid. To remove the ferromagnetic particulates attached to the pole pieces, it is necessary to suspend the flow of the fluid introduced into the magnetic filtration apparatus, and take the magnetic filter unit out of the casing, so that the removal of the ferromagnetic particulates from the pole pieces of the magnetic filter unit is performed in the outside of the apparatus. Furthermore, the ferromagnetic particulates are firmly attached to the pole pieces, thereby rendering the removal operation of the ferromagnetic particulates time-consuming and troublesome, and thus resulting in a significant trouble in its workability.

JPH5-2713U, JP2011-11205A and WO2014/098040A1 propose a magnetic filtration apparatus which is called magnet filter or magnetic inline filter, having a permanent magnet in the outside of a passage through which a liquid to be treated is allowed to flow, so that the magnetic force of the permanent magnet permits magnetic separation of the ferromagnetic particulates from the liquid flowing through the passage. The ferromagnetic particulates are attracted and removed by the magnet from the liquid, and captured in the passage. To take those ferromagnetic particulates out of the passage, the magnetic filtration apparatus is configured such that the magnet is moved along the passage and positioned in a magnetic-force insulation portion not subjected to the magnetic force of the magnet, to cancel the attraction by the magnet, whereby the ferromagnetic particulates are discharged together with the liquid.

However, the above-mentioned type of magnetic filtration apparatus necessarily has a relatively complicated structure for discharging the ferromagnetic particulates out of the flow passage, since the ferromagnetic particulates captured by the magnet arranged in the outside of the flow passage exist within the flow passage, and a discharging passage is required to be installed independently of the flow passage through which the liquid is allowed to flow. In addition, an amount of use of the liquid for sufficiently flowing out the ferromagnetic particulates captured inside the passage tends to be increased, thereby causing a rather significant trouble in treatment of the liquid discharged together with the ferromagnetic particulates. In the case where the discharge of the captured ferromagnetic particulates is insufficient, the liquid after the magnetic separation, which is to flow out from the magnetic filtration apparatus, is contaminated with the ferromagnetic particulates existing in the flow passage, resulting in problems including deterioration of efficiency of purification or filtration of the liquid. Thus, the magnetic filtration apparatus mentioned above is not yet satisfactory in terms of workability of washing or cleaning operation.

SUMMARY OF THE INVENTION

The present invention was completed in view of the background art described above. Therefore, a problem to be solved by the present invention is to provide a magnetic filtration apparatus with a simple structure for permitting an extremely easy and effective discharge of magnetic substances such as ferromagnetic particulates from an inside of a flow passage to its outside, which magnetic substances are captured by attraction from a liquid to be treated by magnetic separation.

In order to solve the above-described problem, the present invention can be preferably embodied in various modes which will be described below. The various modes of the invention described below may be practiced in any combination thereof. It is to be understood that the modes and technical features of the present invention are not limited to those described below, and can be recognized based on the inventive concept disclosed in the specification taken as a whole.

The above-mentioned problem can be solved according to a gist of the invention which provides a magnetic filtration apparatus comprising: (a) a cylindrical treatment container for magnetic separation of magnetic substances, having an inlet into which a liquid contaminated with the magnetic substances is introduced and an outlet from which the liquid after separation and removal of the magnetic substances flows out, on an upper portion of the treatment container, and a discharge port for discharging the magnetic substances separated from the liquid, on a central part of a bottom portion of the treatment container; (b) a magnetic means attached around an outer surface of the treatment container to generate a magnetic field within the treatment container, so that the magnetic substances in the liquid are attracted to an inner wall of the treatment container and separated from the liquid, the magnetic means being configured to permit selective cancellation of an effect of the magnetic field and release of the magnetic substances retained against the inner wall of the treatment container from the inner wall as a result of the cancellation of the effect of the magnetic field, so that the magnetic substances are allowed to fall into a lower portion of the treatment container due to gravity; (c) a detachable collecting container positioned below the treatment container, into which the magnetic substances are allowed to flow due to the gravity, the magnetic substances having been attracted to the inner wall of the treatment container and separated from the liquid, and allowed to fall into the lower portion of the treatment container; (d) a communication passage for communicating the treatment container and the collecting container, and introducing the magnetic substances in the treatment container into the collecting container; and (e) a valve installed on the communication passage for opening and closing the communication passage to permit a flow of the magnetic substances from the treatment container to the collecting container by opening the communication passage.

In one preferable mode of the magnetic filtration apparatus according to the invention, a liquid-introducing passage connected to the inlet in the treatment container for introducing the liquid into a lower space of the treatment container is installed to extend downwardly from the upper portion of the treatment container.

In another preferable mode of the magnetic filtration apparatus according to the invention, the liquid-introducing passage includes a horizontal portion extending in a horizontal direction from the inlet and a vertical portion extending in a vertical direction downwardly from the horizontal portion, and the horizontal portion and the vertical portion form an L-shape.

Furthermore, in still another preferable mode of the magnetic filtration apparatus according to the invention, a lower end of the vertical portion constituting the liquid-introducing passage is sealed, while a peripheral wall located in proximity of the lower end of the vertical portion has a plurality of ejection ports which permit the liquid guided by the liquid-introducing passage to be introduced into the treatment container.

In one of the preferable modes of the magnetic filtration apparatus according to the invention, an introducing tube connected to the communication passage is installed on the collecting container to extend downwardly from an upper portion of the collecting container with a predetermined length, so that the magnetic substances guided by the communication passage are allowed to flow into the collecting container through the introducing tube.

In another one of the preferable modes of the magnetic filtration apparatus according to the invention, the collecting container is transparent, such that an amount of the magnetic substances which have flowed into the collecting container is recognized from an outside of the container.

Furthermore, in the invention, the collecting container preferably comprises a container body with an opening on its upper portion and a lid to seal the opening on the upper portion of the container body, to which lid the communication passage is connected, and the container body and the lid are fastened together by means of a fastening.

In addition, in the invention, the bottom portion of the treatment container advantageously has a tapered shape, and is connected to the discharge port at a minimum diameter part of the tapered shape.

In one of the preferable modes of the magnetic filtration apparatus according to the invention, the magnetic means comprises a cylindrical magnet case detachably attached around the outer surface of the treatment container, and a plurality of permanent magnets installed on the magnet case at a predetermined interval in a circumferential direction of the magnet case, and the effect of the magnetic field for the treatment container is cancelled by detaching the magnet case from the outer surface of the treatment container.

In the invention, the magnet case advantageously consists of two half-split cylindrical pieces divided by a plane extending in an axial direction including an axis of the cylindrical shape, the two half-split cylindrical pieces being rotatable around a pivot parallel to the axis of the cylindrical shape at one of the two pairs of opposite ends of the pieces, and being detachable from each other at the other of the two pairs of opposite ends of the pieces.

Further, in another one of the preferable modes of the invention, each of the two half-split cylindrical pieces has a magnet-accommodating pocket configured to extend in the axial direction of the half-split cylindrical piece and have an opening in one end in the axial direction of the half-split cylindrical piece, and the opening in the magnet-accommodating pocket is sealed with a sealing member in a state where the permanent magnet is accommodated in the magnet-accommodating pocket.

Besides, in still another one of the preferable modes of the invention, the half-split cylindrical piece has a window in the magnet-accommodating pocket, with an opening on an inner surface opposed to the outer surface of the treatment container, and the window permits the permanent magnet to directly oppose to the outer surface of the treatment container through the window.

In addition, in the invention, the outer surface of the treatment container preferably has at least one projection which locks the magnet case attached around the outer surface of the treatment container, thereby positioning the magnet case and preventing the magnet case from moving downwardly.

As described above, in the magnetic filtration apparatus according to the present invention, the magnetism effect by the magnetic means installed in the outside of the treatment container for magnetic separation permits the magnetic substances contaminating the liquid flowing through the treatment container to be attracted to the inner wall of the treatment container, and separated and removed from the liquid. On the other hand, the magnetic substances which have been separated and removed from the liquid, and captured on the inner wall of the treatment container, are allowed to fall into the lower portion of the treatment container due to the gravity, or their own weight, by the cancellation of the effect of the magnetic field generated by the magnetic means.

The treatment container is connected with the detachable collecting container positioned below the treatment container, via the communication passage. Thus, opening the valve installed on the communication passage permits the magnetic substances, which are allowed to fall into and congregate in the lower portion of the treatment container, to automatically flow into the collecting container due to the gravity, namely, their own weight. If the communication passage is blocked by closing the valve at a stage when a predetermined amount of the magnetic substances is accommodated in the collecting container, the magnetic substances collected in the collecting container are easily discharged to the outside of the collecting container by detaching the collecting container. The discharge of the magnetic substances can be simply and easily performed without simultaneously discharging the liquid in the treatment container, thereby resolving the problem of the treatment of the liquid which is discharged simultaneously with the magnetic substances.

Moreover, the above-mentioned magnetic filtration apparatus according to the invention comprises the treatment container for magnetic separation, the collecting container positioned below the treatment container, the communication passage for communicating the treatment container and the collecting container, and the valve installed on the communication passage. By opening the valve, the captured magnetic substances are allowed to flow from the treatment container into the collecting container due to their own weight. Thus, the magnetic filtration apparatus has a simple structure as an apparatus, and also permits a successful discharge of the captured magnetic substances from the treatment container, thereby advantageously avoiding the problem that the captured magnetic substances contaminate the liquid in the treatment container again to deteriorate the quality of the liquid.

BRIEF DESCRIPTION OF THE DRAWINGS

FIG. 6A and FIG. 6B are explanatory views showing an exemplary magnetic apparatus used in the magnetic filtration apparatus shown in FIG. 1, wherein FIG. 6A is its explanatory plan view, and FIG. 6B is its explanatory front view;

FIG. 7A, FIG. 7B and FIG. 7C are explanatory views showing an opening state of the exemplary magnetic apparatus in FIG. 6A and FIG. 6B, wherein FIG. 7A is its explanatory plan view at an opening state of 180 degrees, FIG. 7B is its enlarged explanatory cross sectional view of an end surface taken along a line B-B in FIG. 7A, and FIG. 7C is its partly enlarged explanatory cross sectional view taken along a line D-D in FIG. 7A;

FIG. 8A, FIG. 8B and FIG. 8C are explanatory views showing a half-split cylindrical piece of a main body of a magnet case in the exemplary magnetic apparatus in FIG. 6A and FIG. 6B, wherein FIG. 8A is its explanatory plan view, FIG. 8B is its explanatory front view, and FIG. 8C is its enlarged explanatory cross sectional view of an end surface taken along the line D-D in FIG. 8A;

FIG. 10A and FIG. 10B are explanatory views showing a sealing member for sealing a pocket of the half-split cylindrical piece of the case main body shown in FIG. 9, wherein FIG. 10A is its explanatory plan view and FIG. 10B is its explanatory front view.

DETAILED DESCRIPTION OF THE INVENTION

To further clarify the structure of the present invention, embodiments of the present invention will be described in detail by reference to the drawings.

Figure 1:
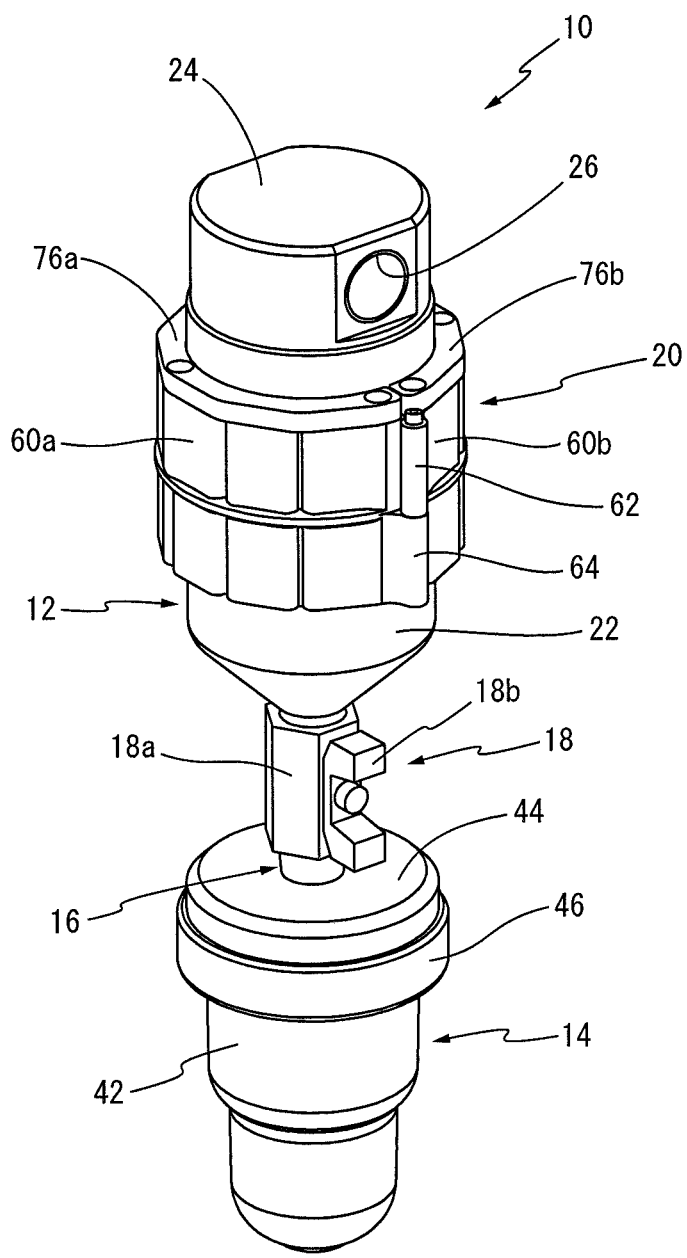
FIG. 1 is an explanatory perspective view showing an exemplary magnetic filtration apparatus according to the present invention.
Figure 2:
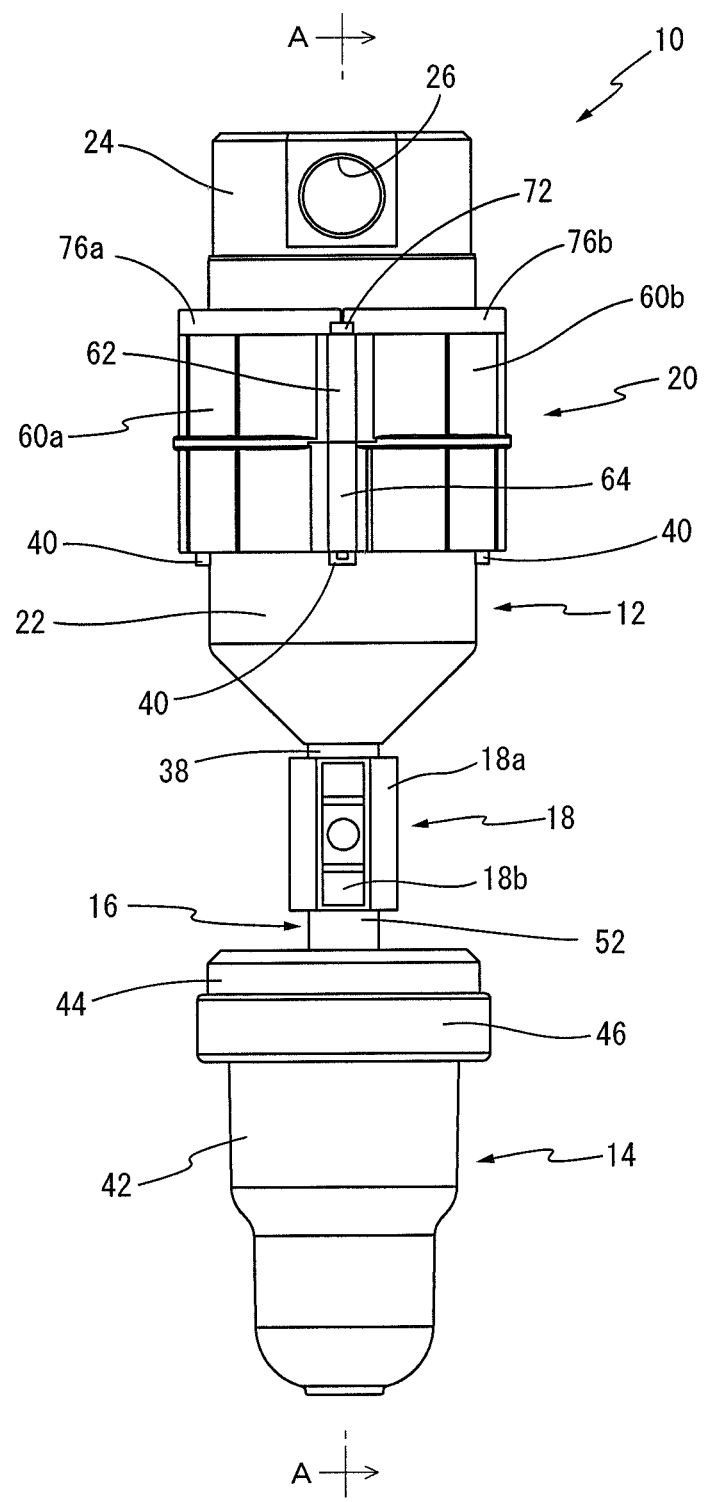
FIG. 2 is an explanatory front view of the magnetic filtration apparatus shown in FIG. 1.
Figure 3:
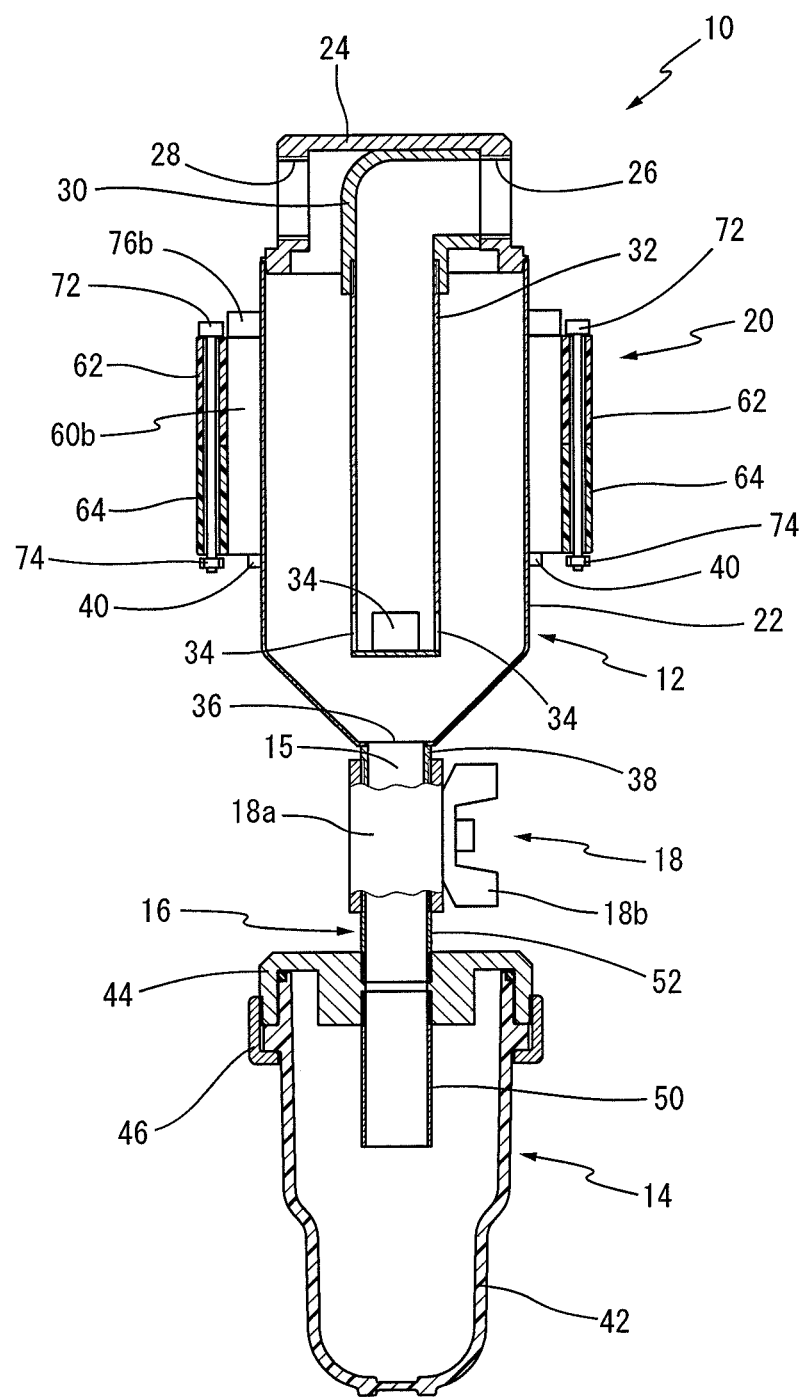
FIG. 3 is an explanatory cross sectional view taken along a line A-A in FIG. 2.

Referring first to the perspective view of FIG. 1, there is shown a magnetic filtration apparatus installed in the midway of a piping of a hydraulic system, in which inside a hydraulic oil circulates to activate a given actuator, as one embodiment of the magnetic filtration apparatus having a structure according to this invention. FIG. 2 is a front view of the magnetic filtration apparatus, and FIG. 3 is a cross sectional view taken along a line A-A of the form shown in FIG. 2. As is seen from the figures, a magnetic filtration apparatus 10 of this embodiment comprises: a cylindrical treatment container 12; a collecting container 14 positioned below the treatment container 12; a connecting part 16 for connecting the treatment container 12 and the collecting container 14, with a communication passage (15) installed in its inside; a valve 18 which is installed on the connecting part 16, and either opens or closes the communication passage (15) formed in the inside of the connecting part 16; and a magnetic apparatus 20 as a magnetic means attached around an outer surface of the treatment container 12.

Figure 4:
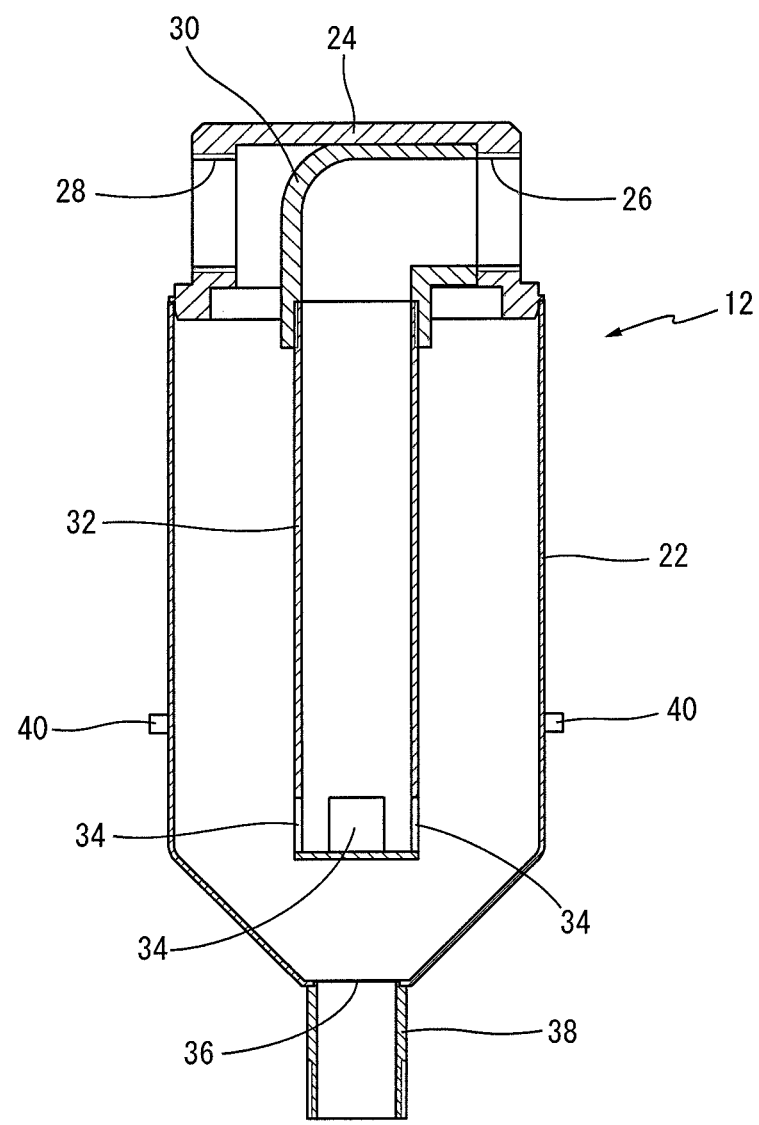
FIG. 4 is an enlarged explanatory cross sectional view of the treatment container shown in FIG. 3.

Described more specifically, as is apparent from FIG. 3, and FIG. 4, the treatment container 12 has a cylindrical main body 22, and an upper opening of the main body 22 is sealed with a cap 24, which has a shape of cylinder with a bottom and is fixedly joined to an opening end of the main body 22 by welding. The cap 24 has an inlet 26 and an outlet 28 symmetrically formed in its opposite side walls. To the inlet 26, a not-illustrated inlet tube constituting a part of the piping of the hydraulic system is connected by screwing, so that the hydraulic oil contaminated with magnetic substances including ferromagnetic particulates such as iron powder flows into the inlet 26 as a liquid to be treated. On the other hand, to the outlet 28, a not-illustrated outlet tube constituting a part of the piping of the hydraulic system is connected by screwing, so that the hydraulic oil purified in the treatment container 12 by magnetic separation of the magnetic substances flows out of the treatment container.

In an inner space of the cap 24, an L-shaped tube 30 as an elbow tube fitting is fixedly installed by welding such that one of the opening ends of the L-shaped tube 30 is connected to an inner opening of the inlet 26. On the other hand, to the other of the opening ends of the L-shaped tube 30, a liquid-passage tube 32 is fixed by screwing so as to extend in the inside of the main body 22 coaxially with the main body 22, to reach a lower space of the main body 22. Thus, the liquid contaminated with the magnetic substances, and taken in from the inlet 26 in the cap 24, is introduced into a lower portion (space) of the main body 22 through the liquid-passage tube 32, via the L-shaped tube 30. The liquid then flows out into the lower space of the main body 22 from four rectangular ejection ports 34, which are provided in proximity of a sealed lower end of the liquid-passage tube 32 at a phase difference of 90 degrees with each other. The L-shaped tube 30 and the liquid-passage tube 32 constitute a liquid-introducing passage, which has a horizontal portion horizontally extending from the inlet 26 and a vertical portion extending downwardly in a vertical direction from the horizontal portion, the horizontal portion and the vertical portion forming an L-shape as a whole.

Furthermore, the main body 22 has a discharge port 36 for discharging the magnetic substances separated from the liquid, at a central part of its bottom portion. The bottom portion of the main body 22 has a tapered shape so as to be connected to the discharge port 36, and the discharge port 36 is formed in an end (lower end) of the main body 22, at which end the tapered shape has a minimum diameter. To the discharge port 36, a connecting tube 38 on the treatment-container side having a predetermined length is fixedly joined by welding to extend downwardly, such that the connecting tube 38 constitutes a part of the connecting part 16 providing a connection with the collecting container 14. In addition, the lower side of the main body 22 has four projections 40 integrally formed on its outer surface at a phase difference of 90 degrees with each other. By locking a lower end of the magnetic apparatus 20 attached around the outer surface of the main body 22 with the four projections, the magnetic apparatus 20 is fixedly positioned in the vertical direction, and is prevented from moving downwardly.

Each of the parts 22-40 constituting the treatment container 12 is a metal product formed of a material such as SUS (Steel Use Stainless), thereby advantageously contributing to corrosion-resistance of the treatment container 12 against the liquid, and ease of performing the magnetic separation, for example.

In the treatment container 12 shown in FIG. 3 and FIG. 4, the liquid contaminated with the magnetic substances, which liquid flows into the treatment container 12 from the inlet 26 formed in the cap 24, is introduced into the liquid-passage tube 32 via the L-shaped tube 30, and then ejected to the lower space of the main body 22 through the plurality of ejection ports 34 disposed around the lower end of the liquid-passage tube 32. Among the magnetic substances, large and heavy particles leave the flow of the liquid and fall within the main body 22 due to their own weight. Those particles are guided along the surface of the bottom portion having the tapered shape, and introduced into the connecting tube 38 on the treatment-container side through the discharge port 36. On the other hand, the liquid ejected from the ejection ports 34 in the liquid-passage tube 32 is guided upwardly in a gap between the liquid-passage tube 32 and the main body 22, and remaining magnetic substances are transferred upward along with the flow of the liquid. Here, the magnetic apparatus 20 attached around the outer surface of the main body 22 generates a suitable magnetic field, and the effect of the magnetic field spreads within the main body 22, so that the remaining magnetic substances are attracted to an inner wall of the main body 22, and magnetically separated. The purified liquid from which the magnetic substances have been removed by the magnetic separation flows out from the outlet 28 in the cap 24, and is provided to the piping of the hydraulic system as purified hydraulic oil.

The presence of the liquid-passage tube 32 gives the configuration to permit the liquid to flow upwardly in the gap between the liquid-passage tube 32 and the main body 22, whereby the effect of the magnetic field generated by the magnetic apparatus 20 is evenly exerted without short-circuiting the inlet 26 and the ejection ports 34. Thus, the magnetic separation can be successfully completed so as to advantageously separate and remove the magnetic substances from the liquid.

The liquid contaminated with the magnetic substances is allowed to flow within the treatment container 12 of the magnetic filtration apparatus 10 for a given period of time, and the flow of the liquid is suspended when an amount or thickness of the magnetic substances retained against the inner wall of the main body 22 has reached a certain degree. While the flow is suspended, the detachable magnetic apparatus 20 is detached from the outer surface of the main body 22, as described later, so that the effect of the magnetic field generated by the magnetic apparatus 20 is cancelled in terms of the main body 22. Thus, the magnetic substances retained against the inner wall of the main body 22 are allowed to fall due to the gravity and are transferred downward. After the magnetic substances have reached the bottom portion of the main body 22, they are guided along its tapered bottom surface toward the discharge port 36, thereby being discharged from the main body 22, and therefore the treatment container 12.

Figure 5:
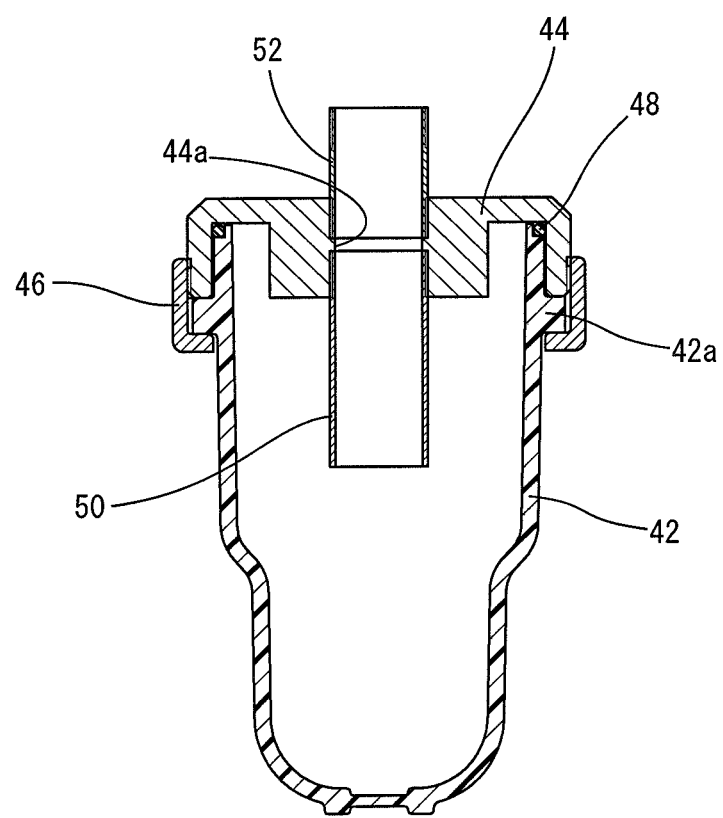
FIG. 5 is an enlarged explanatory cross sectional view of the collecting container shown in FIG. 3.

Meanwhile, as is apparent from FIG. 3 and FIG. 5, the collecting container 14 positioned below the treatment container 12 includes: a container body 42 formed of a transparent resin; a lid 44 for covering an upper opening of the container body 42, which lid is formed of a metal such as the SUS; and a metal fastening ring 46, which is a fastening element to fasten the container body 42 and the lid 44 together. The fastening ring 46 has an L-shaped cross section, and locks a ring-like projection 42a with one side of the L-shape, which projection is formed integrally on an upper portion of an outer surface of the container body 42. While locking the projection 42a, the fastening ring 46 is screwed with a threaded portion formed on an outer surface of a cylindrical side wall of the lid 44, whereby the container body 42 and the lid 44 are connected with each other. The container body 42 is detached from the lid 44 by screwing off the fastening ring 46 from the lid 44. Although the fastening ring 46 permits a durable and secure connection between the resin container body 42 and the lid 44, it is of course acceptable to connect the container body 42 and the lid 44 by directly screwing them together without the fastening ring 46. Specifically, in the case where both of the container body 42 and the lid 44 are formed of a metal, such a direct fastening method may be preferred.

It is noted that an O-ring 48 is inserted between a top end of the outer surface of the container body 42 and a corner portion of an inner side of the lid 44, which O-ring 48 permits the container body 42 to be fluid-tightly connected with the lid 44. Further, the lid 44 has a penetrating hole 44a formed in its central part. An introducing tube 50 with a predetermined length is screwed into the penetrating hole 44a from a downside so as to extend downwardly with the predetermined length, while a connecting tube 52 on the collecting-container side, which connecting tube 52 constitutes a part of the communication passage 15, is fitted by screwing into the penetrating hole 44a from an upside so as to extend upwardly with a predetermined length.

As shown in FIG. 2 and FIG. 3, the connecting tubes 38 and 52 are screwed into respective upper and lower openings of a passageway tube 18a of the valve 18 such that the above-mentioned collecting container 14 and the treatment container 12 positioned above the collecting container 14 are connected with each other to form the connecting part 16. Further, the upper and lower connecting tubes 38 and 52 and the passageway tube 18a, which constitute the connecting part 16, form the communication passage 15 permitting communication between the treatment container 12 and the collecting container 14. It is noted that the valve 18 has a known structure, in which a valve element (not illustrated in the drawings) for closing and opening a passage within the passageway tube 18a is actuated by rotation with a butterfly knob 18b. Communication in an inside of the passageway tube 18a is permitted by rotating the not-illustrated valve element with the butterfly knob 18b, so that the magnetic substances allowed to fall to its bottom portion in the treatment container 12 are further introduced into the collecting container 14 due to the gravity, through the communication passage 15. As the valve 18, any known valve means can be employed as long as it has a function to close or open the inside of the passageway tube 18a, and other known opening and closing means can be employed as well. The valve 18 is generally opened also while the magnetic separation is performed in the treatment container 12 to keep the communication passage 15 open, whereby the magnetic substances brought downward due to the gravity from the liquid flowing through the treatment container 12 is discharged from the discharge port 36 in the bottom portion of the treatment container 12, and accommodated in the collecting container 14 through the communication passage 15.

In summary, in the magnetic filtration apparatus 10 in which the treatment container 12 and the collecting container 14 are connected with each other via the connecting part 16 as described above, the magnetic substances magnetically separated from the liquid flowing into the treatment container 12 are allowed to fall as a large agglomerate from the inner surface of the main body 22 of the treatment container 12, due to the gravity, by removing the magnetic apparatus 20 attached around the outer surface of the treatment container 12 to cancel the magnetic effect. Then, the large agglomerate is guided from the tapered bottom portion of the main body 22 into the connecting tube 38 in the treatment container 12, via the discharge port 36. The large agglomerate is brought further downwardly due to the gravity through the communication passage 15 (passageway tube 18a) kept open by opening the valve 18, and is accumulated in the container body 42 of the collecting container 14, via the connecting tube 52 on the collecting-container side, and further the introducing tube 50.

The container body 42 is made transparent, so that it is possible to visually observe an amount of accommodation (amount of accumulation) of the magnetic substances in the container body 42. Thus, at a stage where the amount of accommodation of the magnetic substances in the container body 42 reaches a predetermined degree, the valve 18 is closed to block the communication passage 15, and the collecting container 14 is detached, so that the magnetic substances accommodated in the collecting container 14 are discharged outside. More specifically, the fastening ring 46 on the collecting container 14 is screwed off and removed from the lid 44, and as a result the container body 42 is removed from the lid 44, too. As such, the predetermined amount of the magnetic substances accommodated in the container body 42 is easily discharged outside.

During the above-mentioned process, the container body 42 is subjected to a flow of the liquid and the magnetic substances existing in a lower portion of the communication passage 15 in terms of the valve 18. However, the introducing tube 50 extending downwardly form the lid 44 prevents the liquid and the magnetic substances from overflowing from the container body 42. The introducing tube 50 limits a liquid level in the container body 42 substantially to a lower end position of the introducing tube 50, and an increase of the liquid level over that position is prevented by the presence of the air packed in the container body 42. That is, the presence of the air permits formation of a suitable space. Thus, even if the liquid and the magnetic substances existing in the lower portion of the communication passage 15 in terms of the valve 18 flow into the space formed in an upper portion of the container body 42, they are prevented from overflowing from the container body 42. Furthermore, an amount of the liquid flowing into the container body 42 is in itself reduced, thereby contributing to reduction of an amount of the liquid discharged outside together with the magnetic substances.

After removing the container body 42 from the lid 44 and discharging the magnetic substances accommodated in the container body 42 as described above, the container body 42 may be again connected to the lid 44 with the fastening ring 46, with the valve 18 opened to unblock the communication passage 15. In this case, the liquid in the treatment container 12 flows into the container body 42 of the collecting container 14 through the communication passage 15. However, even with such an inflow of the liquid, the liquid level in the container body 42 is kept at the substantially lower end position of the introducing tube 50, and the space packed with the air is formed in the upper portion of the container body 42.

Meanwhile, in the above-mentioned magnetic filtration apparatus 10, the magnetic apparatus 20 as a magnetic means detachably attached around the outer surface of the main body 22 constituting the treatment container 12 has the structure shown in FIGS. 6 to 10. More specifically, the magnetic apparatus 20 includes: a magnet case 60 formed of a resin, having a cylindrical shape as a whole and an inside diameter approximately equal to an outside diameter of the main body 22 to which it is attached; and a plurality of permanent magnets (70) described later, which are attached to the magnet case 60 at a predetermined interval in its circumferential direction. The permanent magnets (70) generate the magnetic field within the main body 22 of the treatment container 12, while the effect of the magnetic field exerted to the inside of the treatment container 12 is cancelled by detaching the magnet case 60 from the treatment container 12 (main body 22).

Figure 6A:
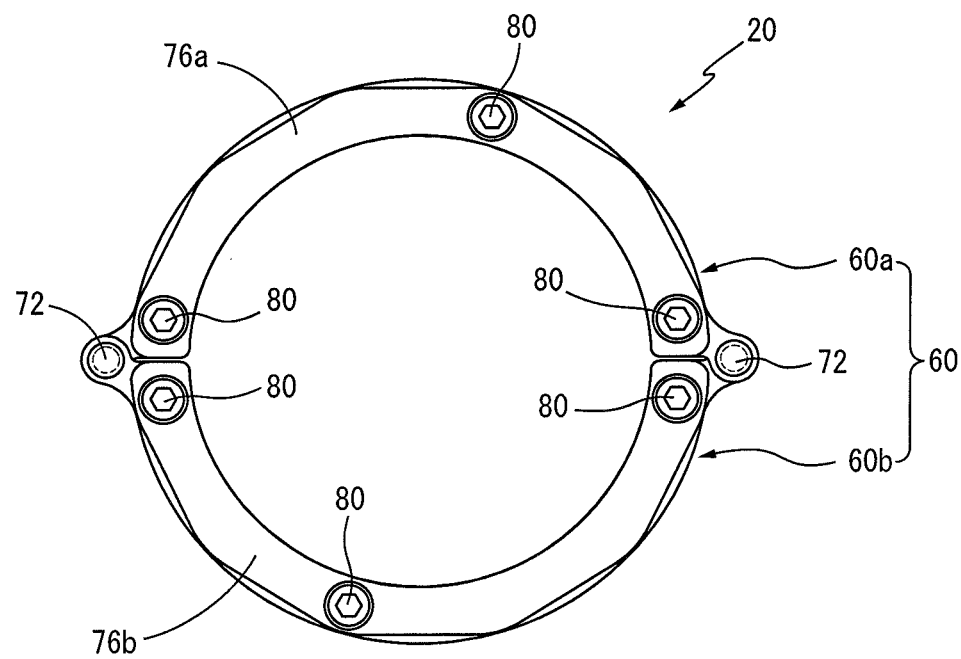
Figure 6B:
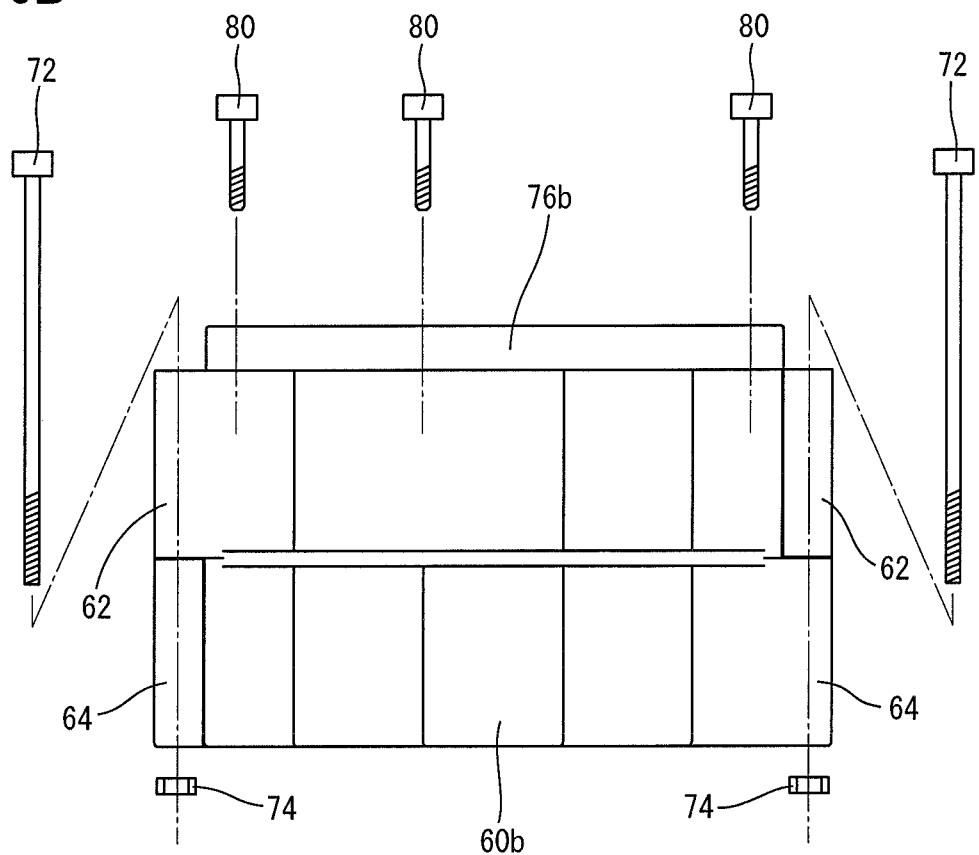
Figure 7A:
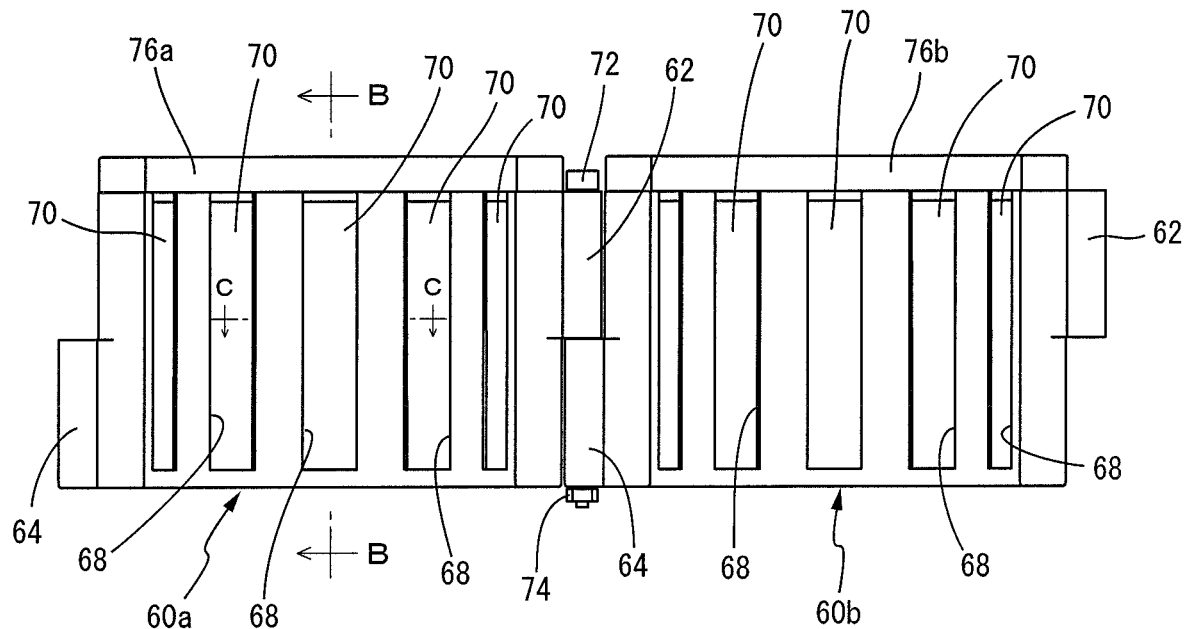

As is apparent from FIG. 6 and FIG. 7, the magnet case 60 is configured to be divided into two half-split cylindrical pieces 60a, 60b by a dividing surface which includes an axis of the cylindrical shape of the magnet case and extends in a direction of the axis. The two half-split cylindrical pieces 60a, 60b having the same structure are rotatable around a pivot parallel to the axis of the magnet case 60, at one of the two pairs of opposite ends. On the other hand, the two half-split cylindrical pieces 60a, 60b are detachable from each other and widely openable at the other of the two pairs of opposite ends, so that the magnet case 60 is removed from the main body 22. FIG. 7A shows a state where the two half-split cylindrical pieces 60a, 60b are rotated at one of the two pairs of opposite ends, and opened with an opening angle of 180°.

Figure 7B:
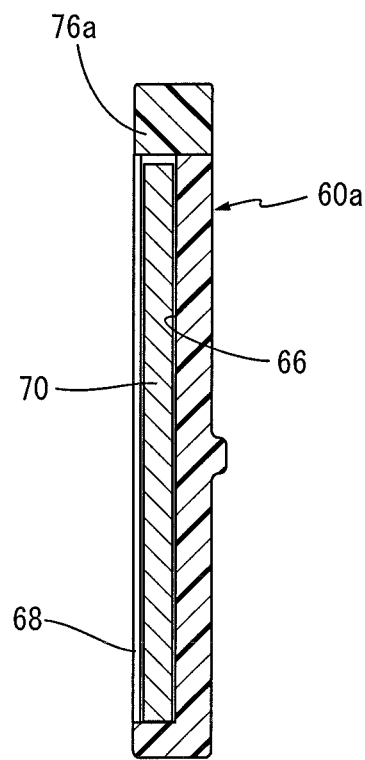
Figure 7C:
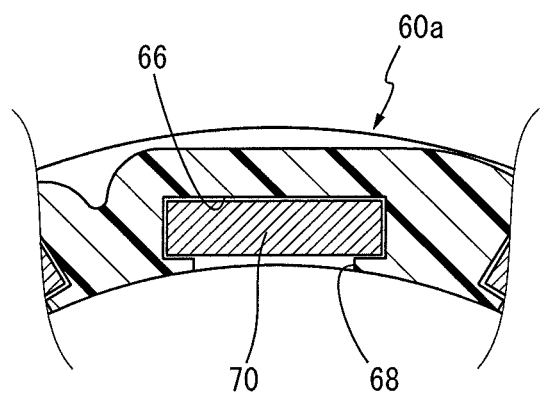
Figure 8A:
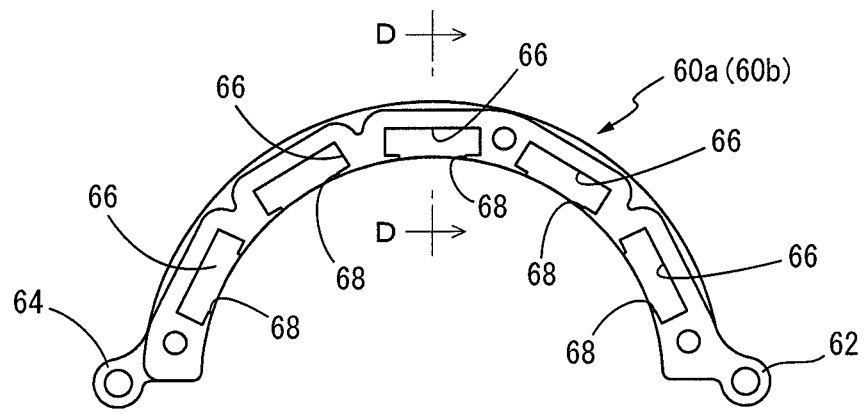
Figure 8B:
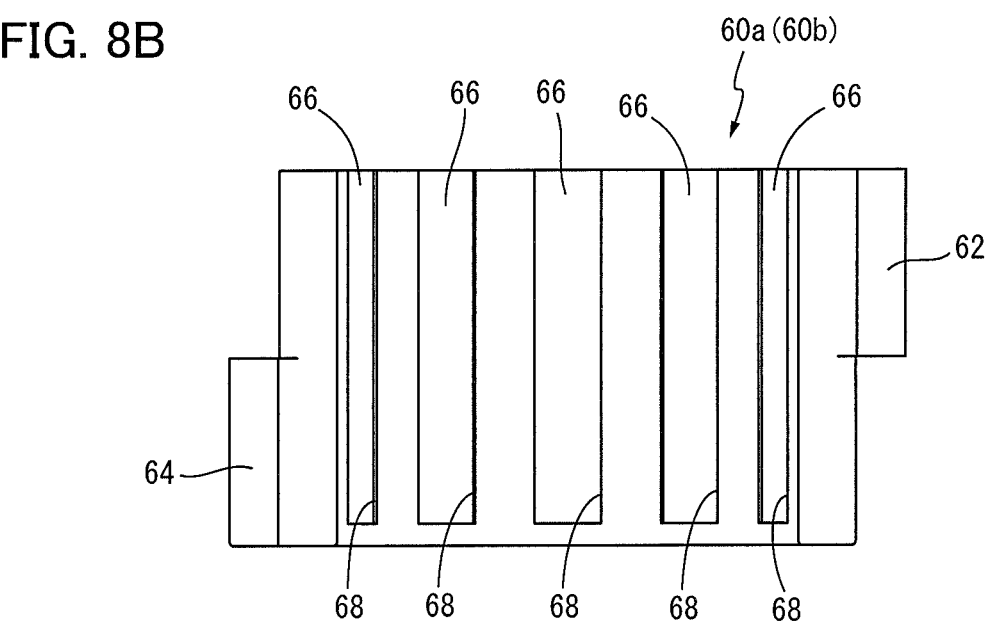
Figure 8C:
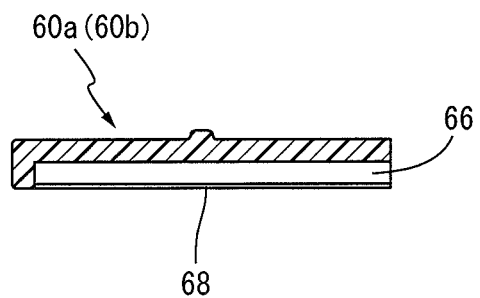
Figure 9:
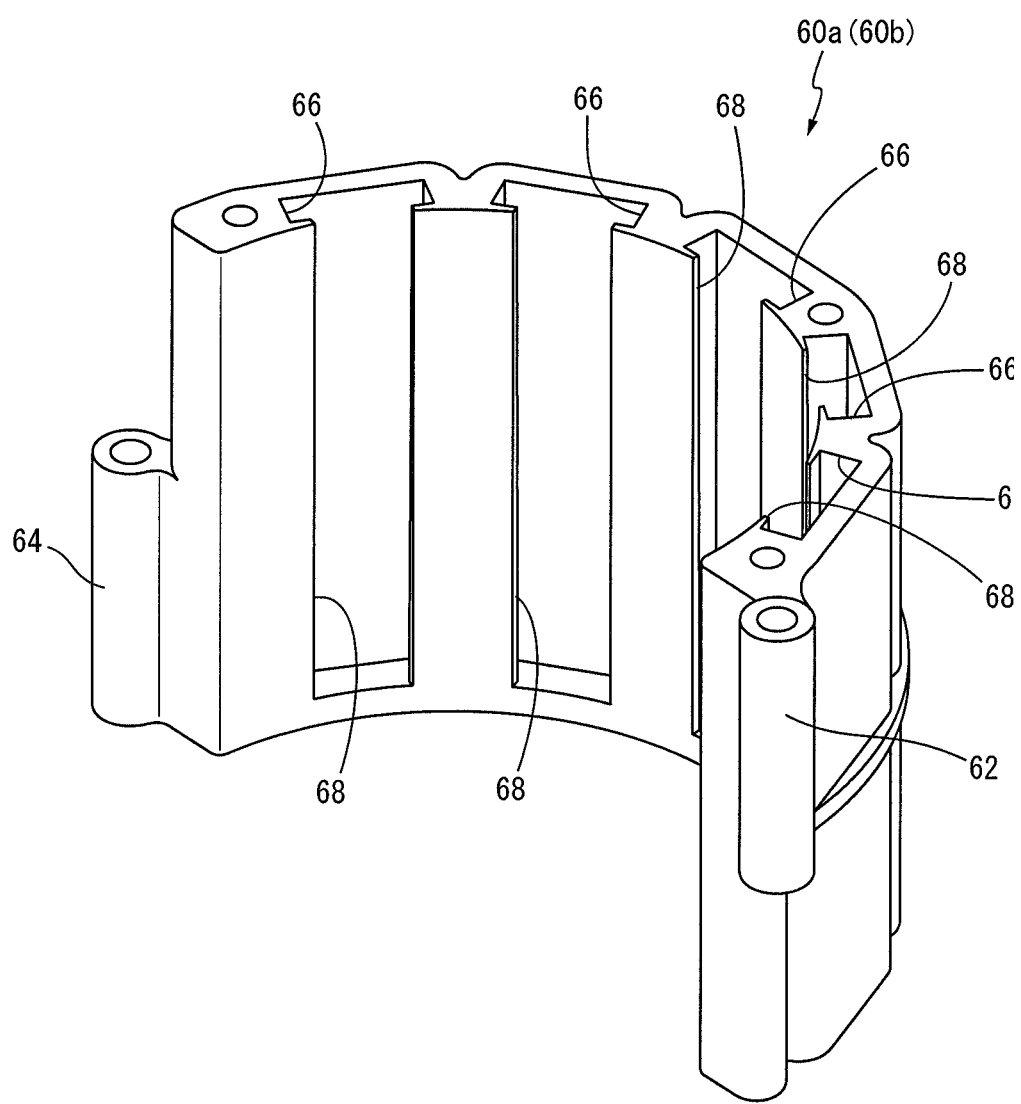
FIG. 9 is an enlarged explanatory perspective view showing the half-split cylindrical piece of the main body of the magnet case shown in FIG. 8A, FIG. 8B and FIG. 8C.

More specifically described, each of the two half-split cylindrical pieces 60a, 60b constituting the magnet case 60 is formed of a suitable resin, and has a structure shown in FIG. 8 and FIG. 9. That is, in each of the half-split cylindrical pieces 60a, 60b, an upper cylindrical portion 62 for a hinge is integrally formed on one of the opposite ends of the semicircular shape of the half-split cylindrical piece, such that the upper cylindrical portion 62 for a hinge is positioned at a substantially upper half part in a height direction of the half-split cylindrical piece, while a lower cylindrical portion 64 for a hinge is integrally formed on the other of the opposite ends, such that the lower cylindrical portion 64 for a hinge is positioned at a substantially lower half part in the height direction. Furthermore, each half-split cylindrical piece 60a (60b) has a plurality of (here, 5) rectangular magnet-accommodating pockets 66 located within its cylindrical wall, at a predetermined interval in a circumferential direction of the cylindrical shape. The magnet-accommodating pockets 66 are configured to open to a top end face of the half-split cylindrical piece 60a (60b), so that the permanent magnets 70 are inserted in the pockets. In addition, each of the magnet-accommodating pockets 66 has a window 68, which opens to an inner surface of the half-cylindrical shape of the half-split cylindrical piece 60a (60b) and has a shape of a rectangle extending in an axial direction of the half-cylindrical shape. Via the window 68, the permanent magnet 70 accommodated in the magnet-accommodating pocket 66 (see FIG. 7) is directly and proximately opposed to the outer surface of the main body 22 of the treatment container 12.

The two half-split cylindrical pieces 60a, 60b are faced to each other at the respective ends, and their upper and lower cylindrical portions 62 and 64 for a hinge are vertically and coaxially superposed on each other. Then, as shown in FIG. 6B, a coupling pin 72 is inserted in the superposed upper and lower cylindrical portions 62 and 64 for a hinge, and a nut 74 is screwed to a threaded portion at an end of the coupling pin 72, whereby the two half-split cylindrical pieces 60a, 60b are connected with each other by a hinge structure at the two respective ends, and made rotatable around the respective coupling pins 72. In addition, by screwing off the nut 74 from one of the coupling pins 72 and pulling out the one of the coupling pins 72, the two half-split cylindrical pieces 60a, 60b are permitted to widely open at the end from which the coupling pin 72 has been pulled out, as shown in FIG. 7A.

Figure 10A:
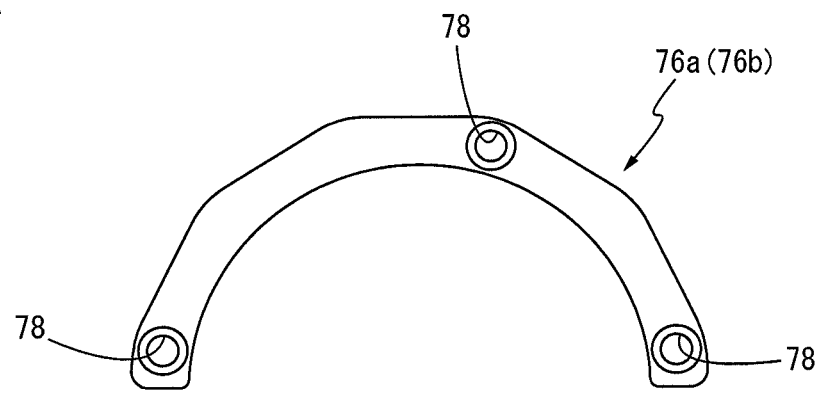
Figure 10B:
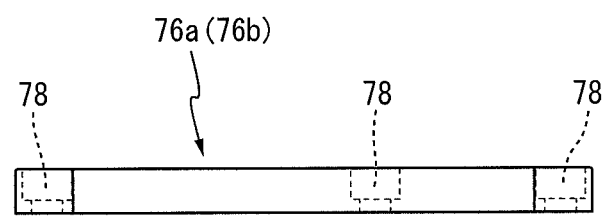

The permanent magnet 70, which exerts the magnetic force within the treatment container 12 to generate the magnetic field, is generally a strong magnet such as a neodymium magnet. As shown in FIGS. 7A, 7B and 7C, the permanent magnet 70 has a longitudinal plate-like shape extending in an axial direction of the magnet case 60, with a width larger than that of the window 68 of the magnet-accommodating pocket 66, whereby the permanent magnet 70 accommodated in the magnet-accommodating pocket 66 is prevented from easily getting out of the window 68. Furthermore, resin sealing members 76a, 76b having a shape of semicircle as shown in FIGS. 10A and 10B are attached to the top end face of each of the half-split cylindrical pieces 60a, 60b for covering and sealing the openings of the magnet-accommodating pockets 66. The sealing members 76a, 76b are disposed on the top end faces of the corresponding half-split cylindrical pieces of the magnet case 60, and then fixed to the respective half-split cylindrical pieces 60a, 60b as shown in FIGS. 6A and 6B, by screwing fixing screws 80 having a hexagonal hole in their heads into screw holes 78 formed in the sealing members 76a, 76b.

When the magnetic apparatus 20 configured as described above is attached to the treatment container 12, more specifically attached around the outer surface of the main body 22, the two half-split cylindrical pieces 60a, 60b are rotated around the coupling pin 72 at one of the two pairs of opposite ends and widely opened, as shown in FIG. 7A, and then disposed around the main body 22 in the opened state. Subsequently, the two half-split cylindrical pieces 60a, 60b are rotated in the opposite direction to close the opening, and overlapped with the outer surface of the main body 22. The other of the two pairs of opposite ends is connected together by the coupling pin 72. Thus, the magnetic apparatus 20 is attracted to and retained against the outer surface of the main body 22 due to the plurality of permanent magnets 70 accommodated in the respective half-split cylindrical pieces 60a, 60b. Meanwhile, the main body 22 has four projections 40 formed on its outer surface with a phase difference of 90 degrees therebetween. By locking the magnetic apparatus 20, more specifically lower ends of the half-split cylindrical pieces 60a, 60b, with the projections 40, the magnetic apparatus 20 is easily positioned in terms of the treatment container 12, and a downward movement of the magnetic apparatus 20 is successfully prevented when the magnetic apparatus 20 is subjected to vibration, a downward load or force and the like. Thus, the magnetic apparatus 20 is fixedly held at a given position, and the magnetic separation of the magnetic substances contaminating the liquid is advantageously performed in a given position in the treatment container 12.

When the effect of the magnetic field generated by the magnetic apparatus 20 is to be cancelled so as to suspend the magnetic separation, the coupling pin 72 connecting one of the two pairs of opposite ends of the two half-split cylindrical pieces 60a, 60b constituting the magnet case 60 is pulled out of the vertically superposed upper and lower cylindrical portions 62 and 64. Then, the two half-split cylindrical pieces 60a, 60b are opened by the rotation around the coupling pin 72 connecting the other of the two pairs of opposite ends together, so that the magnet case 60 is detached from the main body 22 of the treatment container 12. As such, while the attraction and removal operation of the magnetic substances in the liquid in the treatment container 12 is suspended, the magnetic substances attracted to the inner wall of the main body 22 to be captured and accumulated are allowed to fall due to the gravity or their own weight, under suspension of the flow of the liquid.

Then, the valve 18 is opened, whereby the magnetic substances are introduced into the collecting container 14 through the communication passage 15 in a communication state.

In this way, the magnetic apparatus 20 is regularly detached from the outer surface of the main body 22 considering the amount of capture (amount of accumulation) of the magnetic substances attracted to the inner surface of the main body 22 of the treatment container 12, and the captured (accumulated) magnetic substances are allowed to fall and successively accommodated in the collecting container 14. Thus, the liquid flowing in the main body 22 of the treatment container 12 is prevented from being discharged together with the captured magnetic substances when the magnetic substances are discharged outside, thereby advantageously permitting gradually accumulating the magnetic substances in the collecting container 14 without considering reduction (loss) of the liquid.

The above-mentioned magnetic apparatus 20 has the hinge structure with the coupling pin 72 formed on both of the two pairs of opposite ends of the two half-split cylindrical pieces 60a, 60b constituting the magnet case 60. However, it suffices to employ the hinge structure in at least one of the two pairs of opposite ends. Furthermore, if each of the two half-split cylindrical pieces 60a, 60b is securely retained against the outer surface of the main body 22 of the treatment container 12 due to the magnetic force of the permanent magnets 70 accommodated in the piece, a connecting structure itself can be omitted in the other side of the two pairs of opposite ends, in which other side the hinge structure is not formed. Furthermore, it is possible to omit the hinge structure itself.

In the above-mentioned embodiment, the magnetic apparatus 20 is configured to be detachable from the treatment container 12 to cancel the effect of the intended magnetic field generated by the magnetic apparatus 20 within the treatment container 12. However, the generation and cancellation of the magnetic field can be performed also by a conventional structure, in which magnetic-force working and non-working parts are formed in different portions in the axial direction of the treatment container 12, and the magnetic apparatus 20 is selectively moved to the two parts, although the treatment container 12 cannot avoid increasing in size.

Furthermore, although the magnetic apparatus 20 has the plurality of the permanent magnets 70 to generate the intended magnetic field in the exemplified embodiment, it is possible to employ an electromagnet generating magnetism (magnetic force) by electric conduction, in place of the permanent magnet 70. In that case, the generation and cancellation of the magnetism is controlled by turning on and off the electric current for the electromagnet, so that there is no need for manually detaching the magnetic apparatus 20 from the treatment container 12 or moving the magnetic apparatus 20. Thus, it is possible to enjoy advantages such as compactification of the device, and automation and simplification of the magnetic separation and removal of the magnetic substances.

Although one typical embodiment of the invention has been described in detail for illustration purpose only, it is to be understood that the invention is not limited to the details of the preceding embodiment.

For example, the permanent magnet 70 used in the magnetic apparatus 20 is preferably a rare earth magnet having a strong magnetism, such as the neodymium magnet. However, it is acceptable to use various known permanent magnets other than the above-mentioned ones.

Furthermore, although the entirety of the container body 42 is transparent in the above-mentioned embodiment, it is acceptable to make the container body 42 only partly transparent, as long as the amount of the magnetic substances accommodated in the container can be recognized. For example, the container body 42 can have a transparent window in the form of a slit extending in a depth direction of the container body 42. In addition, the container body 42 can be opaque in its entirety, or formed of a metal.

It is to be understood that the present invention may be embodied with various changes, modifications and improvements which may occur to those skilled in the art, without departing from the spirit and scope of this invention, and that such changes, modifications and improvements are also within the scope of this invention.

| NOMENCLATURE OF REFERENCE SIGNS | |
|---|---|
| 10: Magnetic filtration apparatus | 12: Treatment container |
| 14: Collecting container | 15: Communication passage |
| 16: Connecting part | 18: Valve |
| 20: Magnetic apparatus | 22: Main body |
| 24: Cap | 26: Inlet |
| 28: Outlet | 32: Liquid-passage tube |
| 34: Ejection port | 36: Discharge port |
| 38: Connecting tube | 40: Projection |
| 42: Container body | 44: Lid |
| 46: Fastening ring | 50: Introducing tube |
| 52: Connecting tube | 60: Magnet case |
| 60a, 60b: Half-split cylindrical piece | 62: Upper cylindrical portion |
| 64: Lower cylindrical portion | 66: Magnet-accommodating pocket |
| 68: Window | 70: Permanent magnet |
| 72: Coupling pin | 74: Nut |
| 76a, 76b: Sealing member | 80: Fixing screw |

The invention claimed is:

1. A magnetic filtration apparatus comprising:
a cylindrical treatment container for magnetic separation of magnetic substances, having an inlet into which a liquid contaminated with the magnetic substances is introduced and an outlet from which the liquid after separation and removal of the magnetic substances flows out, on an upper portion of the treatment container, and a discharge port for discharging the magnetic substances separated from the liquid, on a central part of a bottom portion of the treatment container;
a magnetic means attached around an outer surface of the treatment container to generate a magnetic field within the treatment container, so that the magnetic substances in the liquid are attracted to an inner wall of the treatment container and separated from the liquid, the magnetic means being configured to permit selective cancellation of an effect of the magnetic field and release of the magnetic substances retained against the inner wall of the treatment container from the inner wall as a result of the cancellation of the effect of the magnetic field, so that the magnetic substances and at least a portion of the liquid are allowed to fall into a lower portion of the treatment container due to gravity;
a detachable collecting container positioned below the treatment container, into which the magnetic substances are allowed to flow due to the gravity, the collecting container including a lower portion containing the at least the portion of the liquid and the magnetic substances, an upper portion, and a lid defining a pocket of air in the upper portion above an upper level of the at least the portion of the liquid, the magnetic substances having been attracted to the inner wall of the treatment container and separated from the liquid, and allowed to fall into the lower portion of the treatment container;

a communication passage for communicating the treatment container and the collecting container, and introducing the magnetic substances in the treatment container into the collecting container;

a valve installed on the communication passage for opening and closing the communication passage to permit a flow of the magnetic substances from the treatment container to the collecting container by opening the communication passage; and wherein the communication passage includes an upper tube portion having a first open end connected to the discharge port of the treatment container and a second open end connected to a valve body, a lower tube portion having a first open end connected to the valve body and a second open end inserted into the lid of the collecting container to a first position midway through the lid, a passageway tube defined within the valve body between the second open end of the upper tube portion and the first open end of the lower tube portion, and an introducing tube portion extending downwardly from the first position in the lid, with a lower end of the introducing tube portion being positioned between a bottom of the lid and the upper level of the at least the portion of the liquid.

2. The magnetic filtration apparatus according to claim 1, wherein a liquid-introducing passage connected to the inlet in the treatment container for introducing the liquid into a lower space of the treatment container is installed to extend downwardly from the upper portion of the treatment container.

3. The magnetic filtration apparatus according to claim 2, wherein the liquid-introducing passage includes a horizontal portion extending in a horizontal direction from the inlet and a vertical portion extending in a vertical direction downwardly from the horizontal portion, and the horizontal portion and the vertical portion form an L-shape.

4. The magnetic filtration apparatus according to claim 3, wherein a lower end of the vertical portion constituting the liquid-introducing passage is sealed, while a peripheral wall located in proximity of the lower end of the vertical portion has a plurality of ejection ports which permit the liquid guided by the liquid-introducing passage to be introduced into the treatment container.

5. The magnetic filtration apparatus according to claim 1, wherein the collecting container is transparent, such that an amount of the magnetic substances which have flowed into the collecting container is recognized from an outside of the collecting container.

6. The magnetic filtration apparatus according to claim 1, wherein the collecting container comprises a container body with an opening on the upper portion and the lid to seal the opening on the upper portion of the container body, and the container body and the lid are fastened together by means of a fastening.

7. The magnetic filtration apparatus according to claim 1, wherein the bottom portion of the treatment container has a tapered shape, and is connected to the discharge port at a minimum diameter part of the tapered shape.

8. The magnetic filtration apparatus according to claim 1, wherein the magnetic means comprises a cylindrical magnet case detachably attached around the outer surface of the treatment container, and a plurality of permanent magnets installed on the magnet case at a predetermined interval in a circumferential direction of the magnet case, and wherein the effect of the magnetic field for the treatment container is cancelled by detaching the magnet case from the outer surface of the treatment container.

9. The magnetic filtration apparatus according to claim 8, wherein the magnet case consists of two half-split cylindrical pieces divided by a plane extending in an axial direction including an axis of a cylindrical shape of the magnet case, the two half-split cylindrical pieces being rotatable around a pivot parallel to the axis of the cylindrical shape at one of two pairs of opposite ends of the two half-split cylindrical pieces, and being detachable from each other at the other of the two pairs of opposite ends of the two half-split cylindrical pieces.

10. The magnetic filtration apparatus according to claim 9, wherein each of the two half-split cylindrical pieces has a magnet-accommodating pocket configured to extend in the axial direction of the two half-split cylindrical pieces and have an opening in one end in the axial direction of the two half-split cylindrical pieces, and wherein the opening in the magnet-accommodating pocket is sealed with a sealing member in a state where the permanent magnets are accommodated in the magnet-accommodating pocket.

11. The magnetic filtration apparatus according to claim 10, wherein at least one of the two half-split cylindrical pieces has a window in the magnet-accommodating pocket, with an opening on an inner surface opposed to the outer surface of the treatment container, wherein the window permits the permanent magnets to directly oppose the outer surface of the treatment container through the window, and wherein the window has a width smaller than a width of at least one of the permanent magnets.

12. The magnetic filtration apparatus according to claim 8, wherein the outer surface of the treatment container has at least one projection which locks the magnet case attached around the outer surface of the treatment container, thereby positioning the magnet case and preventing the magnet case from moving downwardly.

* * * * *